US012699426B2

(12) United States Patent
Arrigoni et al.

(10) Patent No.: US 12,699,426 B2
(45) Date of Patent: Aug. 4, 2026

(54) LID CLOSED MODE AND TABLET MODE DETECTION FOR ELECTRONIC DEVICES

(71) Applicant: STMicroelectronics International N.V., Geneva (CH)

(72) Inventors: Piergiorgio Arrigoni, Domodossola (IT); Stefano Paolo Rivolta, Desio (IT)

(73) Assignee: STMicroelectronics International N.V., Geneva (CH)

( * ) Notice: Subject to any disclaimer, the term of this patent is extended or adjusted under 35 U.S.C. 154(b) by 280 days.

(21) Appl. No.: 18/416,758

(22) Filed: Jan. 18, 2024

(65) Prior Publication Data

US 2025/0238055 A1      Jul. 24, 2025

(51) Int. Cl.
*G06F 1/16* (2006.01)

(52) U.S. Cl.
CPC .................................. *G06F 1/1677* (2013.01)

(58) Field of Classification Search
None
See application file for complete search history.

(56) References Cited

U.S. PATENT DOCUMENTS

| | | | |
|---|---|---|---|
| 10,976,150 B2 | 4/2021 | Zancanato et al. | |
| 11,656,071 B2 | 5/2023 | Rizzardini et al. | |
| 2013/0135352 A1 | 5/2013 | Matsuda et al. | |
| 2016/0147266 A1* | 5/2016 | Chng ..................... | G06F 1/1677 |
| | | | 713/100 |
| 2016/0179137 A1 | 6/2016 | Bendiscioli et al. | |
| 2018/0203564 A1 | 7/2018 | Putzolu et al. | |
| 2020/0159336 A1 | 5/2020 | Torres et al. | |
| 2021/0207940 A1 | 7/2021 | Zancanato et al. | |
| 2022/0350373 A1 | 11/2022 | Cui et al. | |

FOREIGN PATENT DOCUMENTS

WO      WO 2014110567 A2      7/2014

OTHER PUBLICATIONS

"MPU-6000 and MPU-6050 Product Specification Revision 3.4," InvenSense, 52 pages, 2013, www.invensense.com.

* cited by examiner

*Primary Examiner* — Nicholas J Lee
(74) *Attorney, Agent, or Firm* — Seed Intellectual Property Law Group LLP

(57) ABSTRACT

The present disclosure is directed to devices and methods for performing context recognition. The context recognition detects whether the device is in a lid closed mode or a tablet mode. The context recognition is configured to handle exception cases including a first exception case in which context recognition is started while in an upright mode, and a second exception case in which context recognition is started while the device is in a lid closed mode or a tablet mode.

19 Claims, 4 Drawing Sheets

LID CLOSED MODE AND TABLET MODE DETECTION FOR ELECTRONIC DEVICES

BACKGROUND

Technical Field

The present disclosure is directed to devices and methods for detecting whether an electronic device is in a lid closed mode or a tablet mode.

Description of the Related Art

Many electronic devices support power management features to improve user experience and optimize power consumption. For example, many devices support low power states, such as a sleep or hibernate state, that are between an off state (e.g., the device is completely shut down and consumes no power) and an on state (e.g., the device is powered on and ready to be used by a user). Power management features are particularly important for portable devices, such as foldable devices, due to their limited power supply.

Context recognition is often used to customize transitions between power states. Context recognition determines whether the device is in a mode selected from a plurality of modes, including a lid closed mode and a tablet mode. As one example, a foldable laptop computer may switch from an on state to a low power state in response to detecting that the laptop is in a lid closed mode (e.g., the monitor of the laptop is folded onto the keyboard).

Context recognition is typically implemented through the use of Hall sensors and magnets. For example, for a laptop computer, a magnet is positioned on the screen panel of the laptop computer, and a corresponding Hall sensor is positioned on the keyboard panel of the laptop computer. The magnet approaches the Hall sensor as the laptop computer is closed, and the Hall sensor senses the magnetic field generated by the magnet. A lid closed mode is detected when the detected magnetic field exceeds a threshold value.

Unfortunately, such solutions that utilize Hall sensors and magnets have several drawbacks. For example, the Hall sensors are dedicated to detecting magnetic fields generated by the corresponding magnets, and may not be utilized for other applications. In addition, the Hall sensors and magnets are positioned near the edges of the screen panel and the keyboard panel, and results in complex printed circuit board designs to accommodate the Hall sensors and magnets. Further, the presence of the magnets often causes the device itself to become magnetized, which adversely affects performance of other electronic components and sensors. Another drawback is that other sources of magnetic fields, such as another magnet, result in false detections by the Hall sensors. Additionally, Hall sensors have relatively low accuracy, and do not allow for magnetic field thresholds corresponding to precise angles between the screen panel and the keyboard panel.

BRIEF SUMMARY

The present disclosure is directed to devices and methods for performing context recognition. A host processor and a first multi-sensor device are included in a first lid portion (e.g., an upper lid) of the device, and a second multi-sensor device is included in a second lid portion (e.g., a lower lid) of the device. Each of the multi-sensor devices includes one or more types of motion sensors including, but not limited to, an accelerometer and a gyroscope that generate motion measurements.

The context recognition detects whether the device is in a lid closed mode or a tablet mode. The context recognition is configured to handle exception cases including a first exception case in which context recognition is started while in an upright mode, and a second exception case in which context recognition is started while the device is in a lid closed mode or a tablet mode.

In contrast to the use of Hall sensor and magnets, the utilization of the multi-sensor devices allows for the multi-sensor devices to be used for other applications besides context recognition, such as orientation and lid angle detection. In addition, the utilization of the multi-sensor devices does not involve complex printed circuit board designs, as many devices already include such multi-sensor devices. Further, multi-sensor devices do not have the risk of inadvertently magnetizing the device, and are not susceptible to false detections caused by other magnetic sources. The context recognition disclosed herein also has high detection accuracy as customizable, precise thresholds may be set for lid closed mode or a tablet mode detection.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

Figure 1:
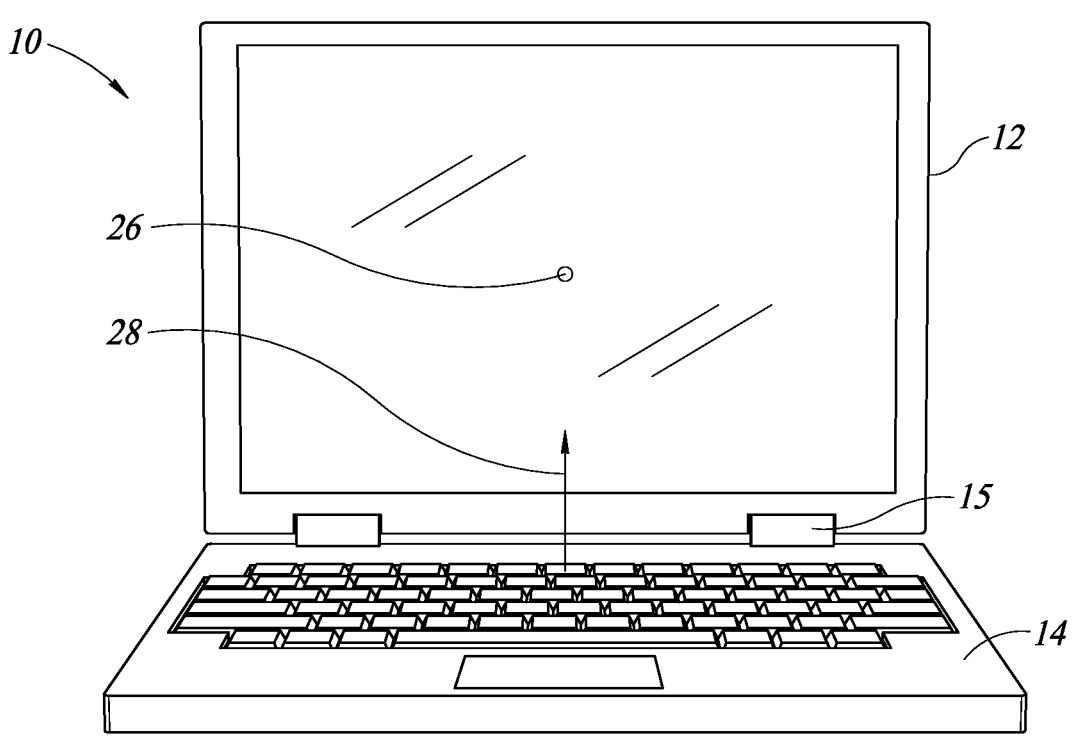
FIG. 1 is a device in a clamshell mode according to an embodiment disclosed herein.

In the following description, certain specific details are set forth in order to provide a thorough understanding of various aspects of the disclosed subject matter. However, the disclosed subject matter may be practiced without these specific details. In some instances, well-known structures, functions, and methods of manufacturing electronic devices, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, context recognition is used, for example, to customize transitions between power states, and is typically implemented by Hall sensors and magnets. However, Hall sensor and magnets have several drawbacks, such as being limited to performing context recognition, causing complex printed circuit board designs, inadvertently magnetizing the device, being susceptible to false detections, and having limited detection accuracy.

The present disclosure is directed to devices and methods for performing context recognition without the use of Hall sensor and magnets. The context recognition detects whether the device is in a lid closed mode or a tablet mode. The context recognition is configured to handle exception cases including a first exception case in which context recognition is started while in an upright mode, and a second exception case in which context recognition is started while the device is in a lid closed mode or a tablet mode. In the first exception case, a lid angle, which is utilized by the context recognition, is unable to be computed because acceleration data cannot be used since the gravity vector is not projected along multiple axes in the upright mode. In the second exception case, the lid closed mode, which has a lid angle of zero degrees, and the tablet mode, which has a lid angle of 360 degrees, cannot be distinguished from each other because the acceleration data are the same.

FIGS. 1, 2, 3, and 4 show a foldable electronic device 10 in various modes or configurations according to an embodiment disclosed herein. The device 10 is configured to detect whether the device is in a lid closed mode or a tablet mode. The device 10 includes a first lid portion and a second lid portion that may be rotated around hinges or a folding portion. In FIGS. 1, 2, 3, and 4, the device 10 is a foldable laptop computer. However, the device 10 may also be another type of foldable device, such as a foldable smartphone or tablet. Other operation modes besides what is shown in FIGS. 1, 2, 3, and 4 are also possible.

FIG. 1 is the device 10 in a clamshell mode according to an embodiment disclosed herein. The device 10 includes the first lid portion, which in this example is an upper lid 12, and the second lid portion, which in this example is a lower lid 14, coupled to the upper lid 12.

The upper lid 12 is a first portion (e.g., a first housing, or a first portion of a single housing) of the device 10 that includes one or more first components, and the lower lid 14 is a second portion (e.g., a second housing, or as second portion of the singe housing) of the device 10 that includes one or more second components. In the embodiment shown in FIG. 1, the upper lid 12 includes a monitor or display, such as a touch screen monitor; and the lower lid 14 includes user inputs, such as a keyboard and a track pad. Other configurations are also possible. For example, each of the upper lid 12 and the lower lid 14 may include a touch screen monitor, or the lower lid 14 may include a touch screen monitor along with the user inputs.

The device 10 is a foldable laptop computer that is configured to fold into a plurality of different operation modes. Stated differently, the upper lid 12 and the lower lid 14 may be rotated around hinges or a folding portion 15 (or a hinge axis 27 in which the hinges 15 extend) into multiple different positions, and a user may operate the device 10 in a plurality of different ways. The angle between the monitor of the upper lid 12 and the user inputs of the lower lid 14 relative to the hinge 15 (or hinge axis 27) is often referred to as a lid angle.

Hinges 15 are shown in FIG. 1. However, the upper lid 12 and the lower lid 14 may also be a single, continuous body that folds or bends onto each other. In this case, the device 10 does not include hinges, and the upper lid 12 and the lower lid 14 fold about a folding portion.

FIG. 1 is the device 10 in a clamshell mode. In the clamshell mode, the upper lid portion 12 is positioned in an upright position such that the monitor faces a user in front of the device 10. The lower lid 14 is positioned horizontally on a surface, such as a table, with the user inputs facing upward. The lid angle is typically between 75 and 125 degrees in the clamshell mode. The device 10 is utilized as a traditional laptop computer in the clamshell mode.

Figure 2:
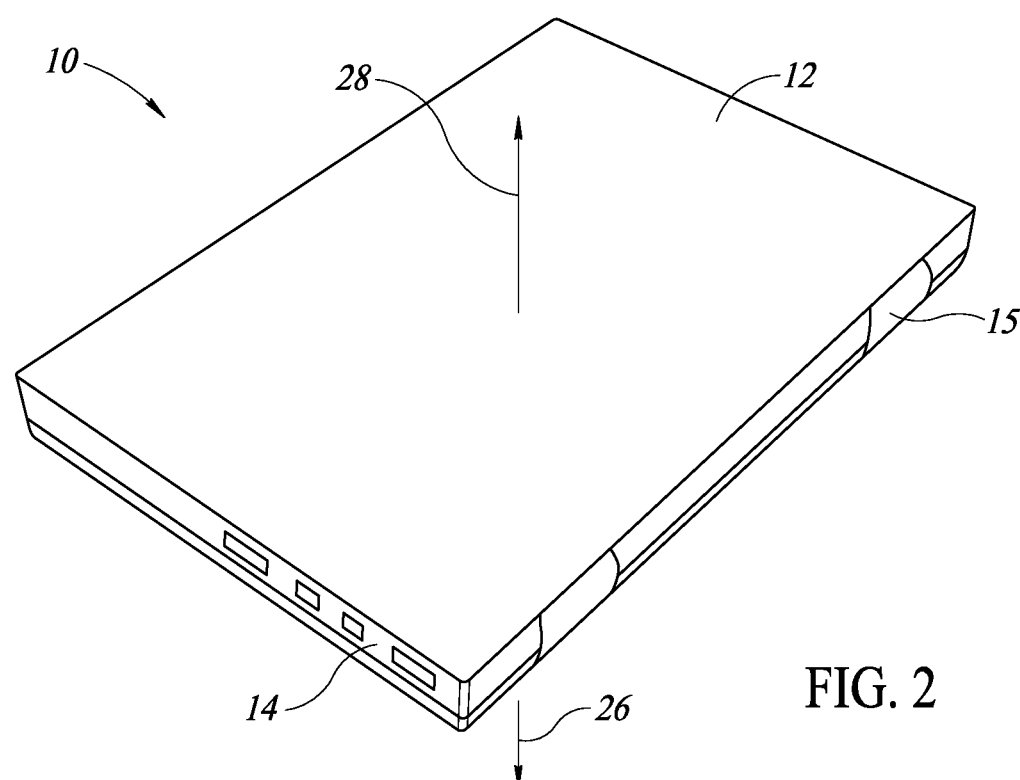
FIG. 2 is a device in a lid closed mode according to an embodiment disclosed herein.

FIG. 2 is the device 10 in a lid closed mode according to an embodiment disclosed herein. In the lid closed mode, the upper lid 12 is folded onto the lower lid 14 such that the monitor of the upper lid 12 and the user inputs of the lower lid 14 face each other. The lid angle is typically considered to be zero degrees in the lid closed mode. The device 10 is typically in transport and/or unused by the user in the lid closed mode.

Figures 3, 4:
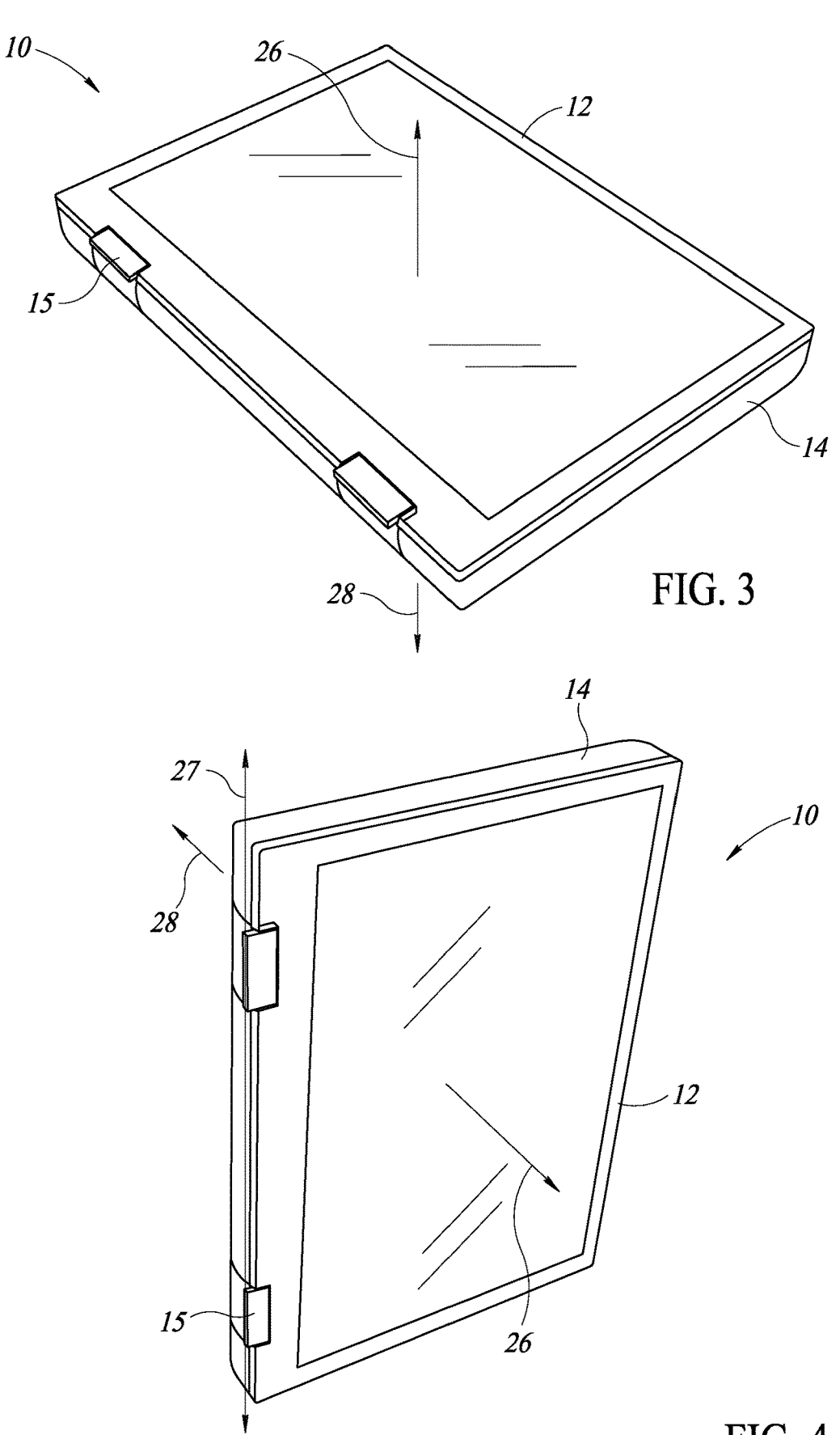
FIG. 3 is a device in a tablet mode according to an embodiment disclosed herein.
FIG. 4 is a device in an upright mode according to an embodiment disclosed herein.

FIG. 3 is the device 10 in a tablet mode according to an embodiment disclosed herein. In the tablet mode, the upper lid 12 is folded onto the lower lid 14. However, in contrast to the lid closed mode shown in FIG. 2, the monitor of the upper lid 12 and the user inputs of the lower lid 14 face in opposite directions. The lid angle is typically considered to be 360 degrees in the tablet mode. The device 10 is used as a table device in the tablet mode. For example, a user utilizes the monitor of the upper lid 12 as a touch screen, but does not use any of the user inputs of the lower lid 14.

FIG. 4 is the device 10 in an upright or book mode according to an embodiment disclosed herein. In the upright mode, the upper lid 12 and the lower lid 14 may have any configuration (e.g., in the lid closed mode in FIG. 2 or the tablet mode in FIG. 3), but is in an upright position with the hinge 15 (or hinge axis 27) perpendicular to the ground (i.e., parallel to gravity).

Figure 5:
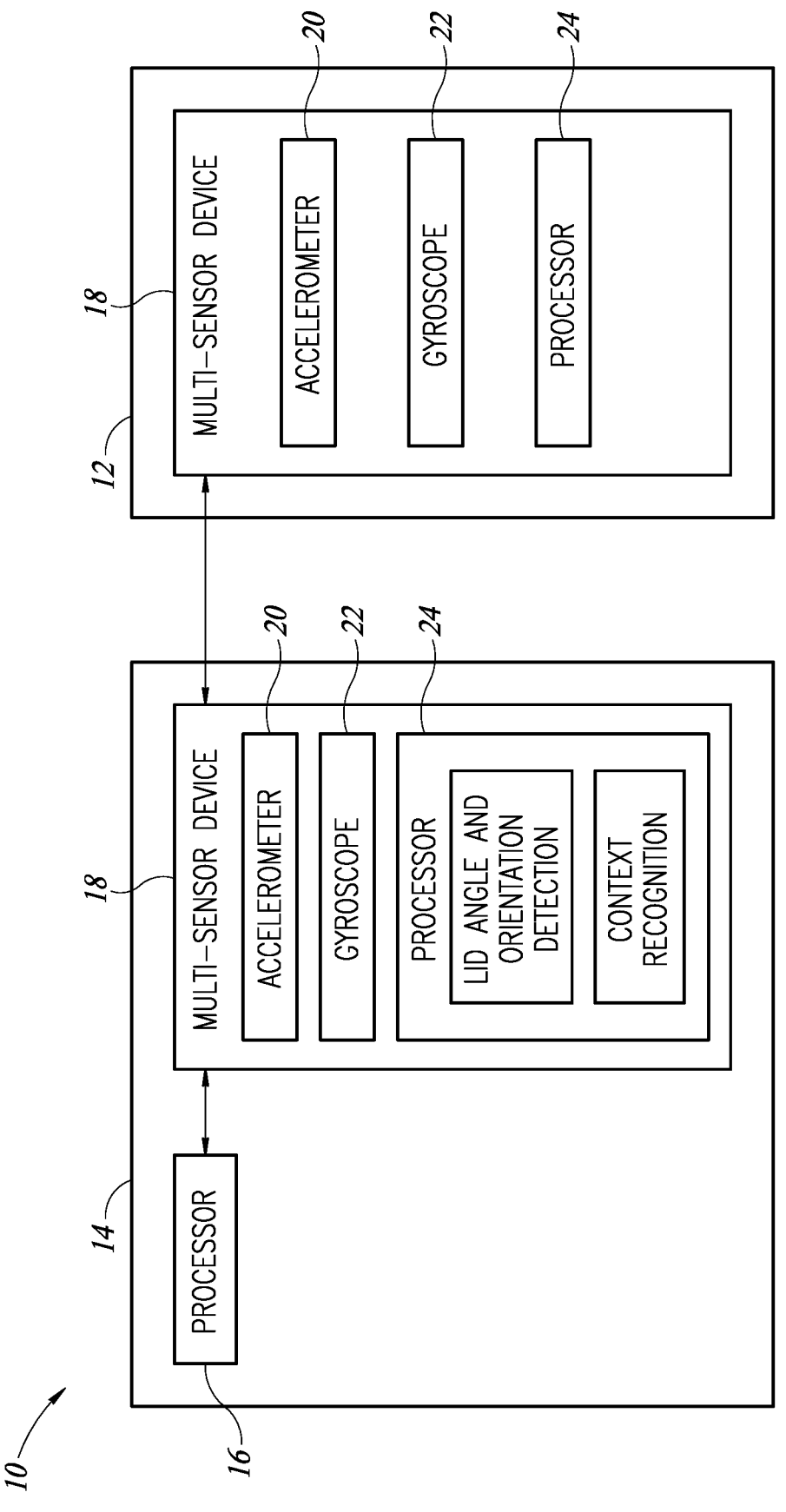
FIG. 5 is a block diagram of a device according to an embodiment disclosed herein.

FIG. 5 is a block diagram of the device 10 according to an embodiment disclosed herein. For the following discussion, the device 10 is the foldable laptop computer as discussed with respect to FIGS. 1, 2, 3, and 4, and the first lid portion and the second lid portion are the upper lid 12 and the lower lid 14, respectively. However, the device 10 may also be another type of foldable device, such as a foldable smartphone or tablet.

Each of the first lid portion and the second lid portions, which in this example are the upper lid 12 and the lower lid 14, respectively, includes a multi-sensor device 18. The second lid portion, which in this example is the lower lid 14, includes a host processor 16. The device 10 may include various other components, such as user inputs in the lower lid 14, a monitor in the upper lid 12, speakers, batteries, etc.

The host processor 16 is a general-purpose processor that performs various functions for the device 10. For example, the host processor 16 executes an operating system, various applications, controls and coordinates hardware components of the device 10, and communicates with any peripheral devices communicatively coupled to the device 10. The host processor 16 may include one or more processors.

The multi-sensor device 18 includes one or more types of motion sensors including, but not limited to, an accelerometer 20 and a gyroscope 22 that generate motion measurements. The accelerometer 20 and the gyroscope 22 measure acceleration and angular velocity or rate, respectively, along one or more axes of the device 10. The multi-sensor device 18 of the lower lid 14 is communicatively coupled to the host processor 16.

The accelerometer 20 included in the upper lid 12 measures acceleration at least along an upper lid axis 26, and the accelerometer 20 included in the lower lid 14 measures acceleration at least along a lower lid axis 28. As shown in FIGS. 1, 2, 3, and 4, the upper lid axis 26 extends in a direction transverse to a surface of the upper lid 12 (e.g., transverse to a direction in which the monitor extends), and the lower lid axis 28 extends in a direction transverse to a surface of the lower lid 14 (e.g., transverse to a direction in which the user inputs extend). The upper lid axis and the lower lid axis are transverse to the hinge axis 27. As will be discussed in further detail below, the measured accelerations along the upper lid axis 26 and the lower lid axis 28 are used for context recognition.

The multi-sensor device 18 also includes its own onboard memory and processor 24 or processing circuitry. The processor 24 is configured to receive and process data generated by the accelerometer 20 and the gyroscope 22, and execute programs (e.g., a finite state machine, machine learning algorithms, etc.) stored in the onboard memory. The processor 24 of the lower lid 14 is configured to perform lid angle and orientation detection and context recognition, which will be discussed in further detail below. The processor 24 may include one or more processors.

In one embodiment, the multi-sensor device 18 included in the lower lid 14 includes the processor 24, but the multi-sensor device 18 included in the upper lid 12 does not include the processor 24. In this embodiment, the processor 24 of the lower lid 14 processes data for the multi-sensor devices 18 included in both the upper lid 12 and the lower lid 14 in order to perform lid angle and orientation detection and context recognition.

In contrast to a general-purpose processor like the host processor 16, the processor 24 is a power-efficient, low-powered device processor that consumes between, for example, 100 and 300 microamps for computational requirements during processing. As such, the multi-sensor device 18 may be always on to perform a method 30 discussed below, which includes lid angle and orientation detection and context recognition, without risk of draining the battery of the device 10. For example, the multi-sensor device 18 may continuously perform the method 30 discussed below regardless of whether the device 10 is in an on state, an off state, or a low power state. As a result, lid angle and orientation detection and context recognition results may always be obtained independent of the power state of the device 10.

The multi-sensor device 18 of the lower lid 14 and the multi-sensor device 18 of the lower lid 12 are communicatively coupled to each other. The multi-sensor device 18, more specifically the processor 24, of the lower lid 14 is configured to receive and process data generated by the accelerometer 20 and the gyroscope 22 included in the multi-sensor device 18 of the upper lid 12.

In FIG. 5, the lid angle and orientation detection and the context recognition are performed by the processor 24 of the lower lid 14. In this case, the multi-sensor device 18 of the lower lid 14 acts as a primary multi-sensor device, and the multi-sensor device 18 of the upper lid 12 acts as a secondary multi-sensor device. The multi-sensor device 18, more specifically the processor 24, of the lower lid 14 is configured to receive data generated by the accelerometer 20 and the gyroscope 22 included in the multi-sensor device 18 of the upper lid 12, and to process data generated by the accelerometer 20 and the gyroscope 22 included in the multi-sensor devices 18 of both the upper lid 12 and the lower lid 14 for the lid angle and orientation detection and the context recognition.

Figure 6:
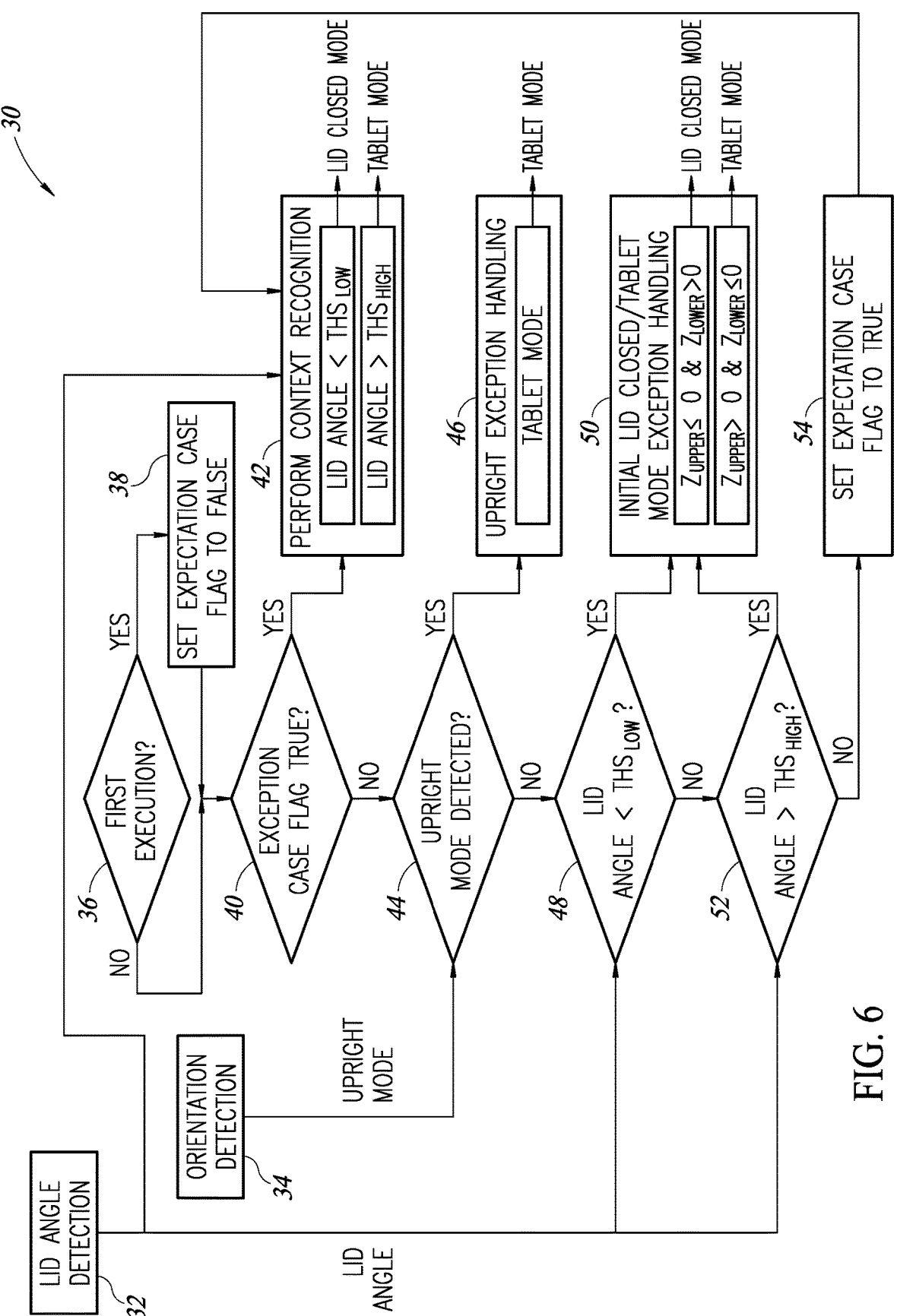
FIG. 6 is a flow diagram of a method for performing context recognition according to an embodiment disclosed herein.

FIG. 6 is a flow diagram of a method 30 for performing context recognition according to an embodiment disclosed herein.

The method 30 is executed by the device 10. More specifically, the method 30 is implemented as a program or a set of instructions that is downloaded and stored in the onboard memory included in the multi-sensor device 18 of the lower lid 14, and is executed by the processor 24 included in the multi-sensor device 18 of the lower lid 14. It is also possible for the program for the method 30 to be stored in memory of the device 10, and executed by the host processor 16 of the device 10.

In block 32, lid angle detection is performed to determine a lid angle of the device 10. The lid angle is the angle between the upper lid 12 (e.g., a surface of the monitor in the upper lid 12) and the lower lid 14 (e.g., a surface of the user inputs in the lower lid 14) relative or around the hinge 15 (or hinge axis 27). As will be discussed in further detail below, the detected lid angle is output to blocks 42, 48, and 52 for use.

The lid angle is determined based on acceleration measurements generated by the accelerometer 20 and (optionally) gyroscope measurements generated by the gyroscope 22 included in the upper lid 12 as well as acceleration measurements generated by the accelerometer 20 and (optionally) gyroscope measurements generated by the gyroscope 22 included in the lower lid 14.

In block 34, orientation detection is performed to determine whether or not the device 10 is in the upright mode. As discussed with respect to FIG. 4, in the upright mode, the device 10 is in an upright position such that the hinge axis 27, which extends through the hinge 15, is extending perpendicular to the ground (i.e., parallel to gravity). Stated differently, the upper lid axis 26 and the lower lid axis 28 are extending parallel to the ground (i.e., perpendicular to gravity). As will be discussed in further detail below, the detected upright mode is output to block 44 for use.

The upright mode is determined based on acceleration measurements generated by the accelerometer 20 included in the upper lid 12 as well as acceleration measurements generated by the accelerometer 20 included in the lower lid 14.

For example, the upright mode is detected in case the acceleration measurements generated by the accelerometer 20 included in both the upper lid 12 and the lower lid 14 indicate that the hinge axis 27, which extends through the hinge 15, is extending perpendicular to the ground (i.e., parallel to gravity).

In block 36, the device 10 determines whether the current execution of the method 30 is a first or initial execution of the method 30. In one embodiment, a first or initial execution of the method 30 is the first execution of the method 30 after the device 10 is set to an off state and then returned to an on state.

In case the device 10 determines the current execution of the method 30 is the first execution of the method 30, the method 30 moves to block 38. In case the device 10 determines the current execution of the method 30 is not the first execution of the method 30 (i.e., the method 30 has already been performed one or more times), the method 30 moves to block 40.

In block 38, the device 10 sets an exception case flag to false (e.g., a bit zero). The exception case flag indicates whether exception cases have already been handled. When the exception case flag is set to false, the exception cases have not been handled yet. When the exception case flag is set to true, the exception cases have already previously been handled.

Exceptions cases include an upright exception in which the method 30 is started while the device 10 is in an upright mode, and an initial lid closed or tablet mode exception in which the method 30 is started while the device 10 is in a lid closed mode or a tablet mode.

In the upright exception, the lid angle detection in block 32 is unable to calculate a lid angle because acceleration data cannot be used since the gravity vector is not projected along multiple axes in the upright mode. Consequently, a rotation of the device in the upright mode does not cause a change in acceleration.

In the initial lid closed or tablet mode exception, the lid closed mode, which has a lid angle of zero degrees, and the tablet mode, which has a lid angle of 360 degrees, cannot be distinguished from each other because the acceleration data are the same.

The upright exception, the initial lid closed or tablet mode exception, and their handling will be discussed below. The method 30 then moves to block 40.

In block 40, the device 10 determines whether the exception case flag is set to true. As discussed above, when the exception case flag is set to true, the exception cases have already been handled.

In case the device 10 determines the exception case flag is set to true, the method 30 moves to block 42. In case the device 10 determines the exception case flag is not set to true (i.e., the exception case flag is set to false), the method 30 moves to block 44.

In block 42, the device 10 performs context recognition to determine whether the device 10 is in a lid closed mode or a tablet mode. As discussed above with respect to FIG. 2, in the lid closed mode, the upper lid 12 is folded onto the lower lid 14 such that the monitor of the upper lid 12 and the user inputs of the lower lid 14 face each other. As discussed above with respect to FIG. 3, in the tablet mode, the monitor of the upper lid 12 and the user inputs of the lower lid 14 face in opposite directions.

The device 10 determines whether the device 10 is in a lid closed mode or a tablet mode based on the lid angle determined in block 32.

In one embodiment, the device 10 determines the device 10 is in a lid closed mode in case the lid angle is less than a low threshold $THS_{LOW}$, and, in response, outputs a context recognition result indicating detection of the lid closed mode.

In one embodiment, the device 10 determines the device 10 is in a tablet mode in case the lid angle is greater than a high threshold $THS_{HIGH}$, and, in response, outputs a context recognition result indicating detection of the tablet mode. In one embodiment, the high threshold $THS_{HIGH}$ is greater than the low threshold $THS_{LOW}$.

The device 10 subsequently controls a function of the device 10 based on the context recognition result. For example, the host processor 16 switches the device 10 from an on state to a low power state in response to detecting the lid closed mode, and changes the user interface of the device 10 in response to detecting the tablet mode.

In block 44, the device 10 determines whether or not the upright mode has been detected in block 34. As discussed with respect to FIG. 4, in the upright mode, the device 10 is in an upright position such that the hinge axis 27, which extends through the hinge 15, is extending perpendicular to the ground (i.e., parallel to gravity).

In case the upright mode is detected in block 34, the method 30 moves to block 46. In case the upright mode is not detected in block 34, the method 30 moves to block 48.

In block 46, the device 10 detects and handles an upright exception in which context recognition is started while the device 10 is in an upright mode. For example, the method 30 is started while the device 10 is in the upright mode.

The upright exception handling in block 46 performs context recognition that cannot be accurately determined in block 42. For example, in the upright exception case, a lid angle, which is used in block 42, is unable to be computed because acceleration data cannot be used due to the gravity vector not projected along multiple axes in the upright mode, and, consequently, a rotation of the device 10 in the upright mode does not cause a change in acceleration data.

In one embodiment, the device 10 determines the device 10 is in a tablet mode in case the upright exception is detected, and, in response, outputs a context recognition result indicating detection of the tablet mode. The tablet mode is automatically detected since it is more likely the user is using the device 10 as a tablet than in any other way (e.g., in a clamshell mode) in the upright mode.

As discussed above, the device 10 subsequently controls a function of the device 10 based on the context recognition result. For example, the host processor 16 changes the user interface of the device 10 in response to detecting the tablet mode.

In block 48, the device 10 determines whether or not the device 10 is potentially in a lid closed mode. The device 10 determines whether or not the device 10 is potentially in a lid closed mode based on the lid angle determined in block 32.

In one embodiment, the device 10 determines the device 10 is potentially in a lid closed mode in case the lid angle is less than a low threshold $THS_{LOW}$. In one embodiment, the low threshold $THS_{LOW}$ in block 48 is equal to the low threshold $THS_{LOW}$ in block 42.

In case the potential lid closed mode is detected in block 48, the method 30 moves to block 50. In case the potential lid closed mode is not detected in block 48, the method 30 moves to block 52.

In block 52, the device 10 determines whether or not the device 10 is potentially in a tablet mode. The device 10 determines whether or not the device 10 is potentially in a tablet mode based on the lid angle determined in block 32.

In one embodiment, the device 10 determines the device 10 is potentially in a tablet mode in case the lid angle is greater than a high threshold $THS_{HIGH}$. In one embodiment, the high threshold $THS_{HIGH}$ in block 52 is equal to the high threshold $THS_{HIGH}$ in block 42.

In case the potential tablet mode is detected in block 52, the method 30 moves to block 50. In case the potential tablet mode is not detected in block 52, the method 30 moves to block 54.

In block 50, the device 10 detects and handles an initial lid closed or tablet mode exception in which context recognition is started while the device 10 is in a lid closed mode or a tablet mode. For example, the method 30 is started while the device 10 is in a lid closed mode or a tablet mode.

The initial lid closed or tablet mode exception handling in block 50 performs context recognition that cannot be accurately determined in block 42. For example, the lid closed mode, which has a lid angle of zero degrees, and the tablet mode, which has a lid angle of 360 degrees, cannot be distinguished from each other because acceleration data are the same while the device is in the lid closed mode or the tablet mode.

The device 10 handles the initial lid closed or tablet mode exception based on acceleration measurements generated by the accelerometer 20 included in the upper lid 12 and the accelerometer 20 included in the lower lid 14. As discussed above, the accelerometer 20 included in the upper lid 12 measures acceleration at least along the upper lid axis 26, and the accelerometer 20 included in the lower lid 14 measures acceleration at least along the lower lid axis 28. As shown in FIGS. 1, 2, 3, and 4, the upper lid axis 26 extends in a direction transverse to a surface of the upper lid 12 (e.g., transverse to a direction in which the monitor extends), and the lower lid axis 28 extends in a direction transverse to a surface of the lower lid 14 (e.g., transverse to a direction in which the user inputs extend).

In one embodiment, the device 10 determines the device 10 is in a lid closed mode in case acceleration along the upper lid axis 26 $Z_{UPPER}$ is less than or equal to zero and acceleration along the lower lid axis 28 $Z_{LOWER}$ is greater than zero, and, in response, outputs a context recognition result indicating detection of the lid closed mode. The lid closed mode is detected since it is more likely the device 10 with a closed lid is positioned on a surface with the monitor facing down, ready to be opened.

In one embodiment, the device 10 determines the device 10 is in a tablet mode in case acceleration along the upper lid axis 26 $Z_{UPPER}$ is greater than zero and acceleration along the lower lid axis 28 $Z_{LOWER}$ is less than or equal to zero, and, in response, outputs a context recognition result indicating detection of the tablet mode. The tablet mode is detected since it is more likely the device 10 in the tablet mode is positioned on a surface with the screen facing up, so that the touch screen of the device 10 can be interacted with.

As discussed above, the device 10 subsequently controls a function of the device 10 based on the context recognition result. For example, the host processor 16 switches the device 10 from an on state to a low power state in response to detecting the lid closed mode, and changes the user interface of the device 10 in response to detecting the tablet mode.

In block 54, the device 10 sets the exception case flag to true (e.g., a bit one). As discussed above, the exception case flag indicates whether exception cases, including the upright exception and the initial lid closed or tablet mode exception, have been handled. When the exception case flag is set to false, the exception cases have not been handled yet. When the exception case flag is set to true, the exception cases have already been handled. The method 30 then moves to block 42, where the device 10 performs context recognition to determine whether the device 10 is in a lid closed mode or a tablet mode.

The various embodiments disclosed herein provide devices and methods for performing context recognition without the use of Hall sensor and magnets. The context recognition utilizes a plurality of multi-sensor devices to detect whether the device is in a lid closed mode or a tablet mode. In contrast to the use of Hall sensor and magnets, the utilization of the multi-sensor devices allows the multi-sensor devices to be used for other applications besides context recognition, does not involve complex printed circuit board designs, do not have the risk of inadvertently magnetizing the device, and is not susceptible to false detections caused by other magnetic sources. Further, the context recognition disclosed herein also has high detection accuracy as customizable, precise thresholds may be set for lid closed mode or a tablet mode detection.

A device may be summarized as including a first lid portion including: a first multi-sensor device including: a first set of motion sensors configured to generate first motion measurements; and a second lid portion coupled to the first lid portion, the second lid portion including: a second multi-sensor device including: a second set of motion sensors configured to generate second motion measurements; and a processor configured to perform context recognition based on the first motion measurements and the second motion measurements. The context recognition determines the device is in a mode selected from a plurality of modes, including a lid closed mode and a tablet mode.

The processor may be configured to: determine a lid angle between the first lid portion and the second lid portion; and determine the device is in the mode based on the lid angle.

The processor may be configured to: determine the device is in the lid closed mode in case the lid angle is less than a first threshold; and determine the device is in the tablet mode in case the lid angle is greater than a second threshold.

A surface of the first lid portion and a surface of the second lid portion face each other in the lid closed mode, and the surface of the first lid portion and the surface of the second lid portion face in opposite directions in the tablet mode.

The context recognition may be performed in case a plurality of exception cases have been previously handled.

The plurality of exception cases may include an upright exception in which the context recognition is started while the device is in an upright position, and an initial lid closed or tablet mode exception in which the context recognition is started while the device is in the lid closed mode or the tablet mode.

The processor may be configured to: determine the device is in the tablet mode if the upright exception is detected.

The processor may be configured to: determine the device is in the lid closed mode in case the initial lid closed or tablet mode exception is detected, first acceleration measurements along a first axis of the first motion measurements is less than or equal to zero, and second acceleration measurements along a second axis of the second motion measurements is greater than zero; and determine the device is in the tablet mode in case the initial lid closed or tablet mode exception is detected, the first acceleration measurements is greater than zero, and the second acceleration measurements is less than or equal to zero.

The processor may be configured to: detect a lid angle between the first lid portion and the second lid portion; and detect the initial lid closed or tablet mode exception in case the lid angle is less than a first threshold or greater than a second threshold.

A method may be summarized as including: generating, by a first multi-sensor device included in a first lid portion of a device, first motion measurements; generating, by a second multi-sensor device included in a second lid portion of the device, second motion measurements; and performing, by a processor included in the second multi-sensor device, context recognition based on the first motion measurements and the second motion measurements. The context recognition determines the device is in a mode selected from a plurality of modes including a lid closed mode and a tablet mode.

The method may further include determining, by the processor, a lid angle between the first lid portion and the second lid portion; determining, by the processor, the device is in the lid closed mode in response to the lid angle being less than a first threshold; and determining, by the processor, the device is in the tablet mode in response to the lid angle being greater than a second threshold.

The method may further include determining, by the processor, a plurality of exception cases have been previously handled; and performing, by the processor, the context recognition in response to determining the plurality of exception cases have been previously handled, the plurality of exception cases including an upright exception in which the context recognition is started while the device is in an upright position, and an initial lid closed or tablet mode exception in which the context recognition is started while the device is in the lid closed mode or the tablet mode.

The method may further include detecting, by the processor, the upright exception; and determining, by the processor, the device is in the tablet mode in response to detecting the upright exception.

The method may further include detecting, by the processor, the initial lid closed or tablet mode exception; determining, by the processor, the device is in the lid closed mode in response to detecting the initial lid closed or tablet mode exception, first acceleration measurements along a first axis of the first motion measurements being less than or equal to zero, and second acceleration measurements along a second axis of the second motion measurements being greater than zero; and determining, by the processor, the device is in the tablet mode in response to detecting the initial lid closed or tablet mode exception, the first acceleration measurements being greater than zero, and the second acceleration measurements being less than or equal to zero.

The method may further include detecting, by the processor, a lid angle between the first lid portion and the second lid portion; and detecting, by the processor, the initial lid closed or tablet mode exception in response to the lid angle being less than a first threshold or greater than a second threshold.

A device may be summarized as including a first lid portion including a first multi-sensor device configured to generate first motion measurements; a second lid portion coupled to the first lid portion, the second lid portion including a second multi-sensor device configured to generate second motion measurements; and a processor configured to perform context recognition based on the first motion measurements and the second motion measurements. The context recognition determines the device is in a mode selected from a plurality of modes including a lid closed mode and a tablet mode.

The processor may be configured to: detect an upright exception in which the context recognition is started while the device is in an upright position; and determine the device is in the tablet mode in response to the upright exception being detected.

The processor may be configured to: detect an initial lid closed or tablet mode exception in which the context recognition is started while the device is in the lid closed mode or the tablet mode; determine the device is in the lid closed mode in response to the initial lid closed or tablet mode exception being detected, first acceleration measurements along a first axis of the first motion measurements being less than or equal to zero, and second acceleration measurements along a second axis of the second motion measurements being greater than zero; and determine the device is in the tablet mode in response to the initial lid closed or tablet mode exception being detected, the first acceleration measurements being greater than zero, and the second acceleration measurements being less than or equal to zero.

The processor may be configured to: detect a lid angle between the first lid portion and the second lid portion; and detect the initial lid closed or tablet mode exception in response to the lid angle being less than a first threshold or greater than a second threshold.

The processor may be configured to: determine a lid angle between the first lid portion and the second lid portion; and determine the device is in the lid closed mode in response to the lid angle being less than a first threshold; and determine the device is in the tablet mode in response to the lid angle being greater than a second threshold.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a first lid portion including:
a first multi-sensor device including:
a first set of motion sensors configured to generate first motion measurements; and
a second lid portion coupled to the first lid portion, the second lid portion including:
a second multi-sensor device including:
a second set of motion sensors configured to generate second motion measurements; and
a processor configured to perform context recognition based on the first motion measurements and the second motion measurements, and detect an upright exception in which the context recognition is started while the device is in an upright position,
the context recognition determines the device is in a mode selected from a plurality of modes including a lid closed mode and a tablet mode,
the processor determines the device is in the tablet mode in response to the upright exception being detected.

2. The device of claim 1 wherein the processor is configured to:
determine a lid angle between the first lid portion and the second lid portion; and
determine the device is in the mode based on the lid angle.

3. The device of claim 2 wherein the processor is configured to:
determine the device is in the lid closed mode in case the lid angle is less than a first threshold; and
determine the device is in the tablet mode in case the lid angle is greater than a second threshold.

4. The device of claim 1 wherein a surface of the first lid portion and a surface of the second lid portion face each other in the lid closed mode, and the surface of the first lid portion and the surface of the second lid portion face in opposite directions in the tablet mode.

5. The device of claim 1 wherein the context recognition is performed in case a plurality of exception cases have been previously handled.

6. The device of claim 5 wherein the plurality of exception cases includes the upright exception, and an initial lid closed or tablet mode exception in which the context recognition is started while the device is in the lid closed mode or the tablet mode.

7. The device of claim 6 wherein the processor is configured to:

determine the device is in the lid closed mode in case the initial lid closed or tablet mode exception is detected, first acceleration measurements along a first axis of the first motion measurements are less than or equal to zero, and second acceleration measurements along a second axis of the second motion measurements are greater than zero; and determine the device is in the tablet mode in case the initial lid closed or tablet mode exception is detected, the first acceleration measurements are greater than zero, and the second acceleration measurements are less than or equal to zero.

8. The device of claim 7 wherein the processor is configured to:

detect a lid angle between the first lid portion and the second lid portion; and detect the initial lid closed or tablet mode exception in case the lid angle is less than a first threshold or greater than a second threshold.

9. A method, comprising:

generating, by a first multi-sensor device included in a first lid portion of a device, first motion measurements;

generating, by a second multi-sensor device included in a second lid portion of the device, second motion measurements; and performing, by a processor included in the second multi-sensor device, context recognition based on the first motion measurements and the second motion measurements, the context recognition determines the device is in a mode selected from a plurality of modes including a lid closed mode and a tablet mode;

detecting, by the processor, an upright exception in which the context recognition is started while the device is in an upright position; and determining, by the processor, the device is in the tablet mode in response to detecting the upright exception.

10. The method of claim 9, further comprising:

determining, by the processor, a lid angle between the first lid portion and the second lid portion;

determining, by the processor, the device is in the lid closed mode in response to the lid angle being less than a first threshold; and determining, by the processor, the device is in the tablet mode in response to the lid angle being greater than a second threshold.

11. The method of claim 9, further comprising:

determining, by the processor, a plurality of exception cases have been previously handled; and performing, by the processor, the context recognition in response to determining the plurality of exception cases have been previously handled, the plurality of exception cases including the upright exception, and an initial lid closed or tablet mode exception in which the context recognition is started while the device is in the lid closed mode or the tablet mode.

12. The method of claim 11, further comprising:

detecting, by the processor, the initial lid closed or tablet mode exception;

determining, by the processor, the device is in the lid closed mode in response to detecting the initial lid closed or tablet mode exception, first acceleration measurements along a first axis of the first motion measurements being less than or equal to zero, and second acceleration measurements along a second axis of the second motion measurements being greater than zero; and determining, by the processor, the device is in the tablet mode in response to detecting the initial lid closed or tablet mode exception, the first acceleration measurements being greater than zero, and the second acceleration measurements being less than or equal to zero.

13. The method of claim 12, further comprising:

detecting, by the processor, a lid angle between the first lid portion and the second lid portion; and detecting, by the processor, the initial lid closed or tablet mode exception in response to the lid angle being less than a first threshold or greater than a second threshold.

14. A device, comprising:

a first lid portion including a first multi-sensor device configured to generate first motion measurements;

a second lid portion coupled to the first lid portion, the second lid portion including a second multi-sensor device configured to generate second motion measurements; and a processor configured to:

perform context recognition based on the first motion measurements and the second motion measurements, the context recognition determines the device is in a mode selected from a plurality of modes including a lid closed mode and a tablet mode;

detect an initial lid closed or tablet mode exception in which the context recognition is started while the device is in the lid closed mode or the tablet mode;

determine the device is in the lid closed mode in response to the initial lid closed or tablet mode exception being detected, first acceleration measurements along a first axis of the first motion measurements being less than or equal to zero, and second acceleration measurements along a second axis of the second motion measurements being greater than zero; and determine the device is in the tablet mode in response to the initial lid closed or tablet mode exception being detected, the first acceleration measurements being greater than zero, and the second acceleration measurements being less than or equal to zero.

15. The device of claim 14 wherein the processor is configured to:

detect an upright exception in which the context recognition is started while the device is in an upright position; and determine the device is in the tablet mode in response to the upright exception being detected.

16. The device of claim 14 wherein the processor is configured to:

detect a lid angle between the first lid portion and the second lid portion; and detect the initial lid closed or tablet mode exception in response to the lid angle being less than a first threshold or greater than a second threshold.

17. The device of claim 14 wherein the processor is configured to:

determine a lid angle between the first lid portion and the second lid portion; and determine the device is in the lid closed mode in response to the lid angle being less than a first threshold; and determine the device is in the tablet mode in response to the lid angle being greater than a second threshold.

18. A method, comprising:

generating, by a first multi-sensor device included in a first lid portion of a device, first motion measurements;

generating, by a second multi-sensor device included in a second lid portion of the device, second motion measurements; and determining, by a processor included in the second multi-sensor device, a plurality of exception cases have been previously handled;

performing, by the processor and in response to determining the plurality of exception cases have been previously handled, context recognition based on the first motion measurements and the second motion measurements, the context recognition determines the device is in a mode selected from a plurality of modes including a lid closed mode and a tablet mode, the plurality of exception cases including an upright exception in which the context recognition is started while the device is in an upright position, and an initial lid closed or tablet mode exception in which the context recognition is started while the device is in the lid closed mode or the tablet mode;

detecting, by the processor, the initial lid closed or tablet mode exception;

determining, by the processor, the device is in the lid closed mode in response to detecting the initial lid closed or tablet mode exception, first acceleration measurements along a first axis of the first motion measurements being less than or equal to zero, and second acceleration measurements along a second axis of the second motion measurements being greater than zero; and determining, by the processor, the device is in the tablet mode in response to detecting the initial lid closed or tablet mode exception, the first acceleration measurements being greater than zero, and the second acceleration measurements being less than or equal to zero.

19. The method of claim 18, further comprising:

detecting, by the processor, a lid angle between the first lid portion and the second lid portion; and detecting, by the processor, the initial lid closed or tablet mode exception in response to the lid angle being less than a first threshold or greater than a second threshold.

* * * * *